INVENTORS
MAX EPHRAIM, JR.,
DONALD L. DE BRAAL
BY Robert L. Spencer
ATTORNEY

United States Patent Office 3,397,513
Patented Aug. 20, 1968

3,397,513
OIL BATH AIR FILTER FLOW CONTROL
Max Ephraim, Jr., Evergreen Park, and Donald L. De Braal, Brookfield, Ill., assignors to General Motors Corporation, Detroit, Mich., a corporation of Delaware
Filed Oct. 4, 1965, Ser. No. 492,500
3 Claims. (Cl. 55—225)

ABSTRACT OF THE DISCLOSURE

A control arrangement for controlling the flow of oil to the filter pads of an oil bath filter for a variable speed internal combustion engine wherein, under conditions of high engine speed, a source of air pressure proportional to engine speed prevents the flow of oil in the fluid passageway between an oil reservoir and the oil circulation system of the oil bath filter.

---

In oil bath air filters in which the suction of the air entering the induction system of an internal combustion engine reduces the pressure in the filtering hood causing the oil, under atmospheric pressure, to be moved from the oil reservoir to the filter pads by the pressure differential, control of the oil movement is often required. Usually at higher engine speeds the air flow increases and produces too great a pressure differential, thus, causing excessive oil flow into the filter pads often resulting in oil carry over into the induction system. Various means have been used to limit the flow of oil from the reservoir to the filter pads such as solenoid controlled valves. However, should a mechanical or electrical difficulty occur in the valve system, resultant oil carry over could coat the compressor and after-tubes in the engine and cause difficulties. In order to eliminate solenoids, valves and the like, the present invention was developed to control the flow of oil from the reservoir to the filter pads.

It is an object of this invention to provide a positive control system that is responsive to engine speed for controlling the amount of oil delivered from the oil reservoir to the oil bath filter pads.

A further object of this invention is to provide an oil flow control having no movable parts.

Another object of this invention is to provide an oil flow control for an oil bath air filter that is controlled by air pressure emanating from the engine, wherein the controlling air pressure increases in direct proportion to the speed of the engine to a predetermined pressure for cutting off the oil supply to the filter pads.

These and other objects of this invention will become more apparent as reference is had to the followng specification and drawings wherein.

Figure 1:
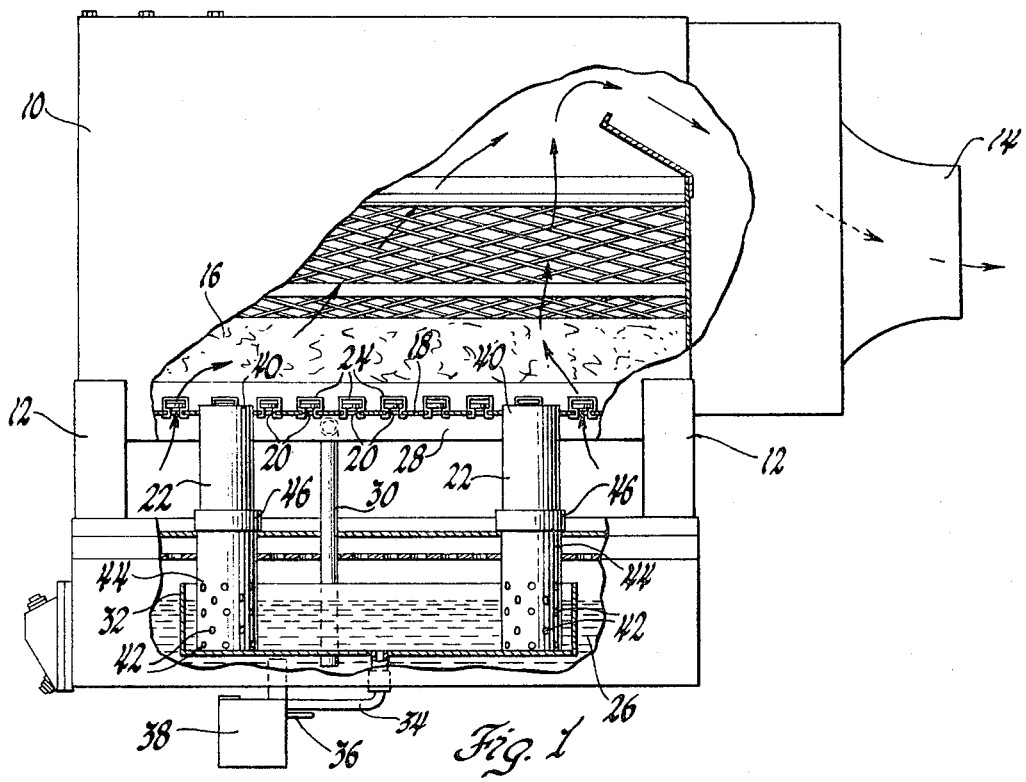
FIGURE 1 is a side view of a conventional oil bath air filter utilizing a conventional solenoid operated valve for controlling the flow of oil from the oil reservoir to the oil delivery pan for subsequent delivery to the filter pads.

Referring now to the drawings, as seen in FIGURE 1, a conventional oil bath air filter that relies upon oil wetted media for removing contaminants from the air stream is shown. The air filter includes a housing 10 with a plurality of air inlets 12 for receiving contaminated air (air flow is in the direction of the arrows) from the atmosphere and exhausting the filtered air through an air outlet 14 adapted for connection to an air intake system of an internal combustion engine or the like. A plurality of oil wetted filtering media or pads 16 of wire mesh or other suitable material filters the contaminants from the air passing through the filter.

In the particular air filter shown in FIGURE 1, the air is drawn into the filter through the air inlets 12 by the suction created by the turbocharger or Roots blower of an internal combustion engine. The air passes through a perforated plate 18 having a plurality of apertures 20 and a small portion of the air passes through two ducts 22. Each aperture 20 has a variflow valve 24 positioned therein for blocking the aperture and limiting the amount of air passing therethrough. The passage of the air through the ducts 22 and the pressure drop created by the variflow valves causes oil in oil reservoir 26 to be pulled in droplet form through the ducts to the filter pads 16 where the oil is deposited and collects contaminants from the air stream. The excess oil drains from the filter media 16 carrying the filtered contaminants into oil collection runners 28 and is piped back to the oil reservoir 26, through a drain tube 30, where the contaminants settle to the bottom and the oil can be recirculated in the filter.

In the prior art, as shown in FIGURE 1, an oil delivery pan 32 is suspended within the reservoir 26 to receive oil therefrom for subsequent delivery to the filter pads. A piping system 34 connects the oil reservoir 26 to the oil delivery pan 32 for gravity feed of oil therebetween. A normally open valve 36 is in the pipe system 34 for blocking the flow of oil therein. A solenoid 38 is operably connected to the valve 36 for closing the valve upon command.

The passage of air through the filter creates an area of reduced pressure above the perforated oil distribution plate 18. This reduced pressure creates a pressure differential between the reservoir 26, under normal atmosphere pressure, and the outlet 40 of the oil ducts 22. The pressure differential causes the oil to be drawn from the oil delivery pan 34 through the apertures 42 in the feeder tubes 44, through the oil distribution pipe 46 to the ducts 22 for delivery to the filtering pads or media 16.

As the speed of the engine increases, the demand for air increases, thus increasing the air flow through the filter and increasing the pressure differential. The increased pressure differential at higher engine throttle settings causes an excessive amount of oil to be carried to the filtering media 22 with the results that the air flow through the filter carries the excessive oil from the filtering media into the air induction system of the engine. To combat this undesirable occurrence, as seen in FIGURE 1, the solenoid 38 was connected to the valve 36 for closing the control valve 36 in the gravity feed system 34, thus controlling the transfer of oil by gravity from the reservoir 26 to the oil delivery pan 34. The solenoid is normally connected to the control throttle of the engine to be actuated at a predetermined throttle setting for closing the valve and preventing excessive amounts of oil to be fed to the filter pads 16. The solenoid actuated valve system is effective for preventing excessive oil flow to the filter pads but the electrically actuated solenoid and mechanical valve are subject to failure, therefor the invention shown in FIGURE 2 for controlling the oil flow between the oil reservoir 26 and oil delivery pan 32, whereby the possibility of electrical or mechanical failure is eliminated, was developed.

Figure 2:
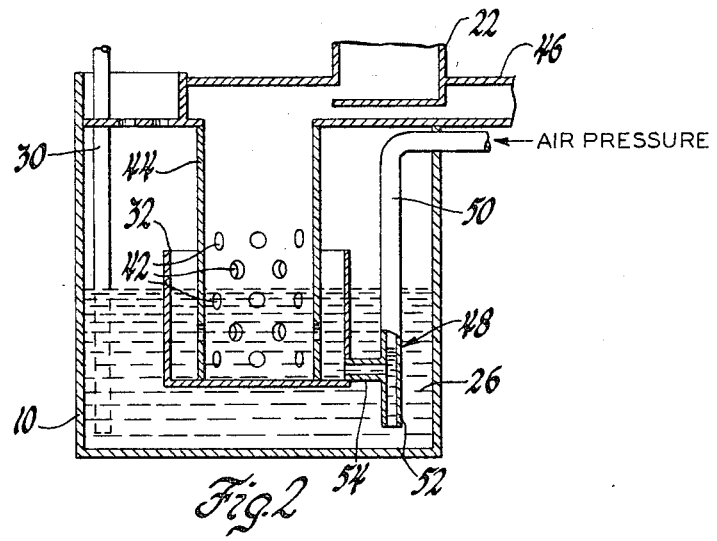
FIGURE 2 is an enlarged side view of a portion of an oil bath air filter of FIGURE 1 in which the present invention is incorporated for controlling the flow of oil from the oil reservoir to the oil delivery pan.

Referring now to FIGURE 2, a T shaped pipe 48 having one arm 50 with one end thereof connected to a source of air under pressure and the other end to the juncture of the T. The source of air under pressure (not shown) is associated with the engine and could be a traction motor blower or the air blower of a turbocharged diesel engine. Such source must have air pressure that increases as the speed of the engine increases.

The other arm 52 has one end thereof opening into the oil reservoir 26 for receiving oil therefrom, and the other end joining the juncture of the T. The stem portion 54 has one end connected to the oil delivery pan 32 and the other end to the juncture of the T so that the oil may flow by gravity through arm 52 to the juncture of the T and then through stem 54 to maintain the oil supply in the oil delivery pan 32.

The T shaped pipe is calibrated so that when the engine reaches a predetermined speed, the air pressure in arm 50 will be sufficient to depress the oil column past the juncture of the T and below the stem portion 54 for blocking delivery of the oil by gravity feed therethrough. When the oil cannot flow to the oil delivery pan 32 due to high engine speeds and resulting high air pressure in arm 50, the delivery of oil to the filtering media will be stopped when the oil in the delivery pan is exhausted. Thus excessive amounts of oil are not delivered to the filtering media at high engine speeds and oil carry over into the air induction system of the engine is prevented. When the engine speed is reduced sufficiently for the air pressure in arm 50 to permit the oil to be fed through arm 52 and stem 54 into the oil delivery pan, recirculation of the oil in the filter will be resumed. The filter can operate continuously without oil flow for extended periods without plugging problems and it is most unlikely an engine will be run at such high speeds continuously for periods that would cause filter failure.

While but one embodiment of this invention is illustrated and described, it is obvious that certain details of construction may be altered without departing from the scope of the invention as defined in the following claims.

I claim:

1. An oil bath air filter adapted for cleaning the air entering the air induction system of an internal combustion engine having a source of air pressurized proportional to vehicle speed, said air filter comprising an air outlet adapted to be operably connected to the air induction system, an air inlet, filter pads between the air inlet and air outlet, an oil reservoir, oil conveyance means for moving oil from said reservoir to said pads, said oil conveyance means including an oil delivery pan and an oil feed pipe connecting said reservoir to said oil delivery pan for gravity feed of oil therebetween, and an air pressure pipe adapted to fluidly connect said source of air to said oil feed pipe, said pressurized air from said source effectively blocking passage of oil between said reservoir and said oil delivery pan when the engine exceeds a predetermined speed.

2. An oil bath air filter adapted for cleaning the air entering the air induction system of a variable speed internal combustion engine having a source of air pressurized proportional to engine speed, said air filter comprising; an air outlet adapted to be operably connected to the air induction system, an air inlet, an air filtering media positioned between said air inlet and said air outlet for removing contaminants from air passing therebetween, an oil reservoir, circulating means for circulating oil from said oil reservoir through said filtering media and back to said oil reservoir, said circulating means including a first pipe for passing oil therethrough a portion of the distance between said oil reservoir and said filtering media, and a second pipe connecting said source of pressurized air to said first pipe of said circulating means said pipes being calibrated so that said pressurized air effectively blocks movement of oil through said first pipe when said engine exceeds a predetermined speed.

3. An oil bath air filter adapted for cleaning the air entering the air induction system of a variable speed internal combustion engine having a source of air proportional to vehicle speed, comprising: a housing having an air inlet and an air outlet, said air outlet adapted to be operably connected to the air induction system; a filtering media interposed in the housing between the air inlet and the air outlet; a quantity of oil contained in an oil reservoir in the housing; oil collection means located adjacent the filtering media and adapted to collect excess oil draining from the latter; conduit means fluidly connecting the oil collection means and the reservoir; circulating means having an end portion interposed in the oil for circulating oil from the reservoir to the filtering media; pipe means having a first end portion adapted to be fluidly connected to the source of pressurized air and a pair of branch pipes formed at a second end portion, one of said branch pipes fluidly communicating with the circulating means, the other of said branch pipes fluidly communicating with the reservoir at a predetermined vertical distance below said one of said branch pipes whereby oil is directed from said reservoir to said circulating means in a fluid path in the form of an oil column through the branch pipes and wherein said fluid path is blocked under predetermined high pressure conditions in said source by a pressurized column of air depressing said oil column to a vertical distance below said other of said branch pipes.

References Cited

UNITED STATES PATENTS

| 1,838,512 | 12/1931 | Wilson. | |
| 1,860,111 | 5/1932 | Miller. | |
| 2,966,958 | 1/1961 | Sexton | 55—250 |
| 3,134,825 | 5/1964 | Sexton | 55—225 |

HARRY B. THORNTON, *Primary Examiner.*

B. NOZICK, *Assistant Examiner.*